United States Patent
Nagori et al.

(10) Patent No.: US 12,422,978 B2
(45) Date of Patent: Sep. 23, 2025

(54) USER INTERACTION MANAGEMENT TO REDUCE LAG IN USER-INTERACTIVE APPLICATIONS

(71) Applicant: Samsung Electronics Co., Ltd., Suwon-si (KR)

(72) Inventors: Nazrinbanu Nurmohammad Nagori, Bengaluru Karnataka (IN); Divyanshu Chuchra, Bengaluru Karnataka (IN); Jiyoun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/659,965

(22) Filed: May 9, 2024

(65) Prior Publication Data

US 2024/0385742 A1     Nov. 21, 2024

Related U.S. Application Data

(63) Continuation of application No. PCT/KR2024/003793, filed on Mar. 26, 2024.

(30) Foreign Application Priority Data

May 19, 2023  (IN) .............................. 202341035099
Jul. 27, 2023  (IN) .............................. 202341035099

(51) Int. Cl.
  *G06F 3/0488*     (2022.01)
  *H04N 7/01*       (2006.01)
(52) U.S. Cl.
  CPC ......... *G06F 3/0488* (2013.01); *H04N 7/0135* (2013.01)
(58) Field of Classification Search
  CPC ............... G06F 3/0488; G06F 3/04845; G06F 3/04842; H04N 7/0135; G06N 20/00
  See application file for complete search history.

(56) References Cited

U.S. PATENT DOCUMENTS 10,726,560 B2   7/2020  Holzer et al.
10,741,143 B2   8/2020  Dimitrov
(Continued)

FOREIGN PATENT DOCUMENTS

CN         105630228 A       6/2016
KR    10-2019-0017293 A      2/2019
(Continued)

OTHER PUBLICATIONS

Simon Niklaus et al., "Video Frame Interpolation via Adaptive Separable Convolution", ICCV paper, 2017, pp. 261-270.
(Continued)

*Primary Examiner* — Chanh D Nguyen
*Assistant Examiner* — Gloryvid Figueroa-Gibson
(74) *Attorney, Agent, or Firm* — NIXON & VANDERHYE P.C.

(57) ABSTRACT

Embodiments herein provide a method for user interaction management in a user-interactive application in an electronic device. The method includes: generating and displaying artificial frame in-between a plurality of real frames of the user-interactive application and receiving a user input on the artificial frame displayed in-between the plurality of real frames of the user-interactive application; detecting an object in the artificial frame on which the user input is received; determining a correlation between the user input, coordinates of object in real frame of the plurality of real frames, and coordinates of the object in the artificial frame based on the detected object in the artificial frame; and displaying an interaction of the object in the artificial frame based on the determined correlation.

15 Claims, 11 Drawing Sheets

(56) References Cited

U.S. PATENT DOCUMENTS

| | | |
|---|---|---|
| 10,776,688 B2 | 9/2020 | Jiang et al. |
| 10,890,764 B2 | 1/2021 | Tan et al. |
| 11,301,083 B2 | 4/2022 | Perlin et al. |
| 11,949,858 B2 | 4/2024 | Masule et al. |
| 12,335,516 B2 | 6/2025 | Yang et al. |
| 2008/0031338 A1* | 2/2008 | Sato ............... H04N 19/51 375/E7.258 |
| 2010/0245372 A1 | 9/2010 | Gedik et al. |
| 2013/0332836 A1* | 12/2013 | Cho ............... G11B 27/34 715/723 |
| 2016/0041691 A1 | 2/2016 | Leigh |
| 2019/0261000 A1 | 8/2019 | Oh et al. |
| 2021/0385409 A1 | 12/2021 | Li |
| 2023/0117969 A1 | 4/2023 | Zimring et al. |
| 2024/0202942 A1 | 6/2024 | Lee et al. |

FOREIGN PATENT DOCUMENTS

| | | |
|---|---|---|
| KR | 10-2022-0157765 A | 11/2022 |
| KR | 10-2023-0022401 A | 2/2023 |
| KR | 10-2023-0032325 A | 3/2023 |

OTHER PUBLICATIONS

Webpage: "NVIDIA Introduces DLSS 3 With Breakthrough AI-Powered Frame Generation for up to 4x Performance", Online: https://nvidianews.nvidia.com/news/nvidia-introduces-dlss-3-with-breakthrough-ai-powered-frame-generation-for-up-to-4x-performance, 3 pages, Sep. 20, 2022, NVIDIA Newsroom.

Search Report and Written Opinion dated Jul. 16, 2024 issued in International Patent Application No. PCT/KR2024/003793.

* cited by examiner

USER INTERACTION MANAGEMENT TO REDUCE LAG IN USER-INTERACTIVE APPLICATIONS

CROSS-REFERENCE TO RELATED APPLICATIONS

This application is a continuation of International Application No. PCT/KR2024/003793 designating the United States, filed on Mar. 26, 2024, in the Korean Intellectual Property Receiving Office and claiming priority to Indian Provisional Patent Application No. 202341035099, filed on May 19, 2023, and to Indian Complete patent application Ser. No. 202341035099, filed on Jul. 27, 2023, in the Indian Patent Office, the disclosures of each of which are incorporated by reference herein in their entireties.

TECHNICAL FIELD

The disclosure relates to an electronic device. For example, the disclosure relates to a system and a method for user interaction management to reduce lag in a user-interactive application.

BACKGROUND

Currently, mobile devices support computationally intensive applications that are graphically demanding. In some conventional systems, the mobile devices are adding an interpolated (artificial) frame to increase frame rate to provide smoother motions, but the artificial frame introduces lag by ignoring a user input, when the user gives input on the artificial frame. Hence, when the user input is ignored within the artificial frame, immediate result on the artificial frame can result in inferior responses from the user perspective.

A frame interpolation feature is used to predict one or more intermediate or artificial frames at timestamps defined between two real frames. The frame interpolation feature increases a frame rate of videos, games or creates slow-motion videos. The frame interpolation feature is used to automatically increasing frames per second (fps) of dynamic pictures during playing games, watching videos, etc. When the frame interpolation feature is enabled, a delay in the user input is increased for applications like gaming applications. In addition, the frame interpolation feature increases the frame rate during playing games, watching videos, and the like on various mobile devices. The frame interpolation feature is performed by adding additional frames between the real frames and improving overall experience of the user.

Unlike to movie playback or creating of slow-motion videos, the interpolation frames of user-interactive application (for example, gaming application) may vary based on the user interactions and the user input. When the frame interpolation feature is enabled, the frame rate is boosted, for example, from 60 fps to 90 fps or 120 fps by inserting artificial frames in between the real frames. However, the frame interpolation feature also introduces the lag (delay) for user interactions performed on the artificial frames.

Thus, it is desired to address the above-mentioned disadvantages or other shortcomings or at least provide a useful alternative.

SUMMARY

According to an example embodiment, a method for user interaction management in a user-interactive application is provided. The method includes: generating and displaying artificial frame in-between a plurality of real frames of the user-interactive application; receiving an input on the artificial frame displayed in-between the plurality of real frames of the user-interactive application; detecting object in the artificial frame on which the input is received and determining a correlation between the input, coordinates of object in a real frame of the plurality of real frames, and coordinates of object in the artificial frame based on the detected object in the at least one artificial frame; and enabling interaction with the object in the artificial frame based on the determined correlation.

In an example embodiment, the interaction with the at least one object in the at least one artificial frame is enabled by applying a transformation matrix based on the determined correlation.

In an example embodiment, the method includes: generating or training an AI model; monitoring a plurality of inputs on the plurality of objects in a plurality of artificial frames and the plurality of real frames of the user-interactive application, and determining the correlation of coordinates of the input, the coordinates of the object in the real frame, the coordinates of the object in the artificial frame using the trained AI model.

In an example embodiment, the artificial frame is generated using at least any one of interpolation method and extrapolation method.

In an example embodiment, the real frames include discontinuous motion area and/or continuous motion area.

In an example embodiment, the method includes: performing the interaction of the input by applying an input transformation matrix in response to received input; determining whether the input is received on the discontinuous motion area of the artificial frame or the continuous motion area of the artificial frame; applying the input transformation matrix to the continuous motion area based on the input being received on the continuous motion area or ignoring the received input by skipping the AI model based on the input being received on the discontinuous motion area.

In an example embodiment, the method includes inputting a received input to the AI model based on the input being received on the artificial frame or sending the received input to the user-interactive application based on the input being received on the real frame.

According to an example embodiment, an electronic device for user interaction management in the user-interactive application is provided. The electronic device includes: a memory, at least one processor, comprising processing circuitry, coupled to the memory, and a user interaction controller communicatively coupled to the memory and the processor. The user interaction controller is configured to: display the artificial frame in-between the plurality of real frames of the user-interactive application; receive the input on the artificial frame displayed in-between the plurality of real frames of the user-interactive application; detect the object in the artificial frame on which the user input is received; determine the correlation between the input, coordinates of the object in the real frame of the plurality of real frames, and coordinates of the object in the artificial frame based on the detected object in the artificial frame; and enable interaction with the object in the artificial frame based on the determined correlation.

These and other aspects of the various example embodiments herein will be better appreciated and understood when considered in conjunction with the following description and the accompanying drawings. It is understood, however, that the following descriptions, while indicating various example embodiments and numerous specific details thereof, are given by way of illustration and not of limitation. Many changes and modifications be made within the scope of the embodiments herein without departing from the spirit thereof, and the embodiments herein include all such modifications.

BRIEF DESCRIPTION OF THE DRAWINGS

These and other features, aspects, and advantages of certain embodiments of the present disclosure will be more apparent from the following detailed description, taken in conjunction with the accompanying drawings, throughout which like reference letters indicate corresponding parts in the various figures, in which.

Figure 1:
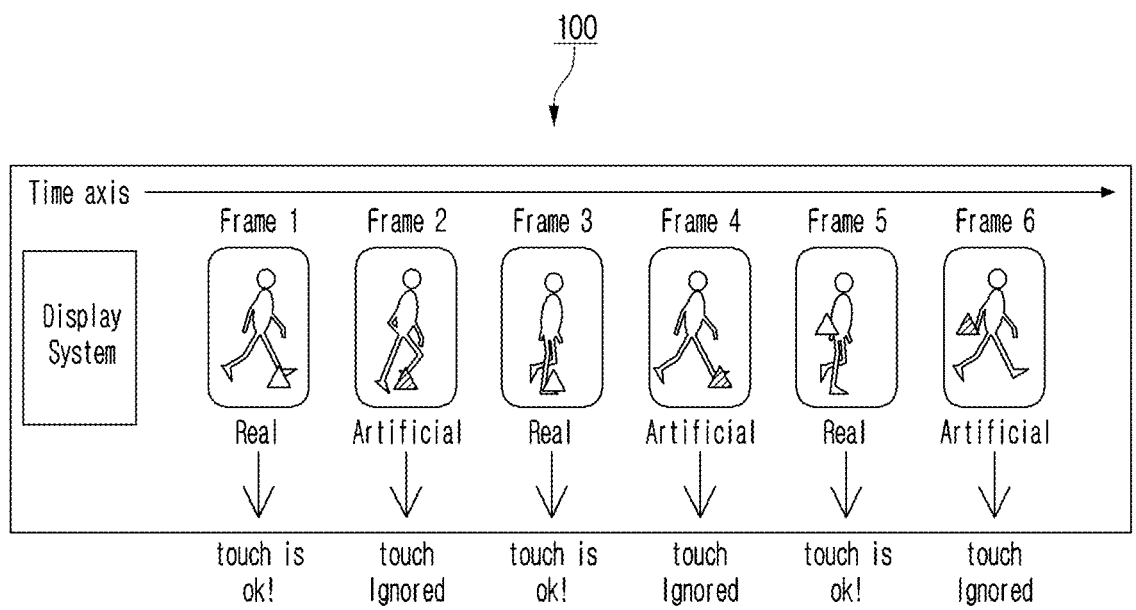
FIG. 1 is a diagram illustrating a scenario in which a user input is ignored in an artificial frame, according to the prior art.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the disclosure. Furthermore, the elements may have been represented in the drawing by conventional symbols, and the drawings may show only those specific details that are pertinent to the understanding the embodiments of the disclosure so as not to obscure the drawing with details that will be readily apparent to those of ordinary skill in the art having benefit of the description herein.

DETAILED DESCRIPTION

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. Also, the various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the disclosure herein.

Various example embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits of a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the disclosed method. Likewise, the blocks of the embodiments be physically combined into more complex blocks without departing from the scope of the disclosed method.

The accompanying drawings are used to aid in easily understand various technical features and it is understood that the embodiments presented herein are not limited by the accompanying drawings. As such, the disclosed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

The terms "discontinuous motion area" and "static area" are used interchangeably throughout the disclosure.

The terms "continuous motion area" and "non-static area" are used interchangeably throughout the disclosure.

The term "user-interactive application" may refer, for example, to an accelerated application that allows users to interact with various content such as audiovisual information, visualization, VR/AR content, etc. Such accelerated applications can be computationally intensive on the electronic device that requires multiple computations (using for example, GPU, CPU, and other hardware components of the electronic device) to function as designed.

The term "transformation matrix" may refer, for example, to a map of the coordinates of the object in the artificial frame with the coordinates of the object in the real frame. The transformation matrix represents the pixel-to-pixel correspondences between artificial frame and previous real frame displayed to the user.

Accordingly, various embodiments disclose a method for user interaction management in a user-interactive application in an electronic device. The method may include: generating and displaying artificial frame in-between a plurality of real frames of the user-interactive application receiving an input on the artificial frame displayed in-between the plurality of real frames of the user-interactive application; detecting object in the artificial frame on which the input is received and determining a correlation between the input, coordinates of object in a real frame of the plurality of real frames, and coordinates of object in the artificial frame based on the detected object in the at least one artificial frame; and enabling interaction with the object in the artificial frame based on the determined correlation.

Accordingly, the various example embodiments disclose the electronic device for user interaction management in the user-interactive application. The electronic device includes: a memory, at least one processor, comprising processing circuitry, coupled to the memory, and a user interaction controller communicatively coupled to the memory and the processor. The user interaction controller may be configured to: generate and display the artificial frame in-between the plurality of real frames of the user-interactive application; receive the input on the artificial frame displayed in between the plurality of real frames of the user-interactive application; detect the object in the artificial frame on which the input is received; determine the correlation between the input, coordinates of the object in the real frame of the plurality of real frames, and coordinates of the object in the artificial frame based on the detected object in the artificial frame; and enable interaction with the object in the artificial frame based on the determined correlation.

In a conventional method, the quality of interpolated frames is assessed by considering the user's head movements, velocity, and head angle while the user wearing the Virtual Reality (VR) headset. Also, the conventional method includes a head-mounted display/VR headset and a motion sensor like an accelerometer (e.g., G-sensor), and a gyroscope (e.g., gyro-sensor). Further, the conventional method tracks linear movement, and direction of the linear movement, or rotational movement (e.g., rotational angular velocity or rotational angle) of the VR headset. The conventional method aims to enhance viewing experience by providing smooth transitions between video frames based on the user's head movement. The interpolated frames serve to bridge visual gaps between real frames, resulting in a more immersive and seamless viewing experience for the user wearing a head-mounted display. However, the conventional method fails to provide an input (e.g., a user input) to create future frames (or upcoming/subsequent frames) when the user input is given in the previous artificial frame that leads to create lag for users.

Unlike the conventional method, the user input information is used to create the future frames. The future frames are generated based on the user inputs given for previous artificial frames. When the user input is a touch input, a touch transformation technique helps to find accurate coordinates using pixel to pixel correspondence technique and using the coordinates to create the future frames thereby reducing the lag in the user-interactive applications.

Referring now to the drawings and more particularly to FIGS. 1 through 12, where similar reference characters denote corresponding features consistently throughout the figures, these are shown various example embodiments.

FIG. 1 is a diagram (100) illustrating a scenario in which a user input is ignored in an artificial frame, according to the prior art. As shown in FIG. 1, in frames 1-6 are displayed on a display system in which frames 1, 3, 5 are real frames generated by the user-interactive application and frames 2, 4, 6 are artificial frames generated using the frame interpolation feature. In the conventional method, when a user performs a touch input on the artificial frames 2, 4, 6, the display system ignores the user input. In the conventional method, it is not always possible to accurately recognize the intention of the touch map co-ordinates from the user because the user performs action based on what user sees on the display device. The display device can either display the real frame or the artificial frame but the user is unaware of the same. Due to this, the conventional method accepts the user input only in the real frames 1, 3, 5. The ignorance of the user input in the artificial frame leads to lag/delay in displaying the frames by the user-interactive application.

Figure 2:
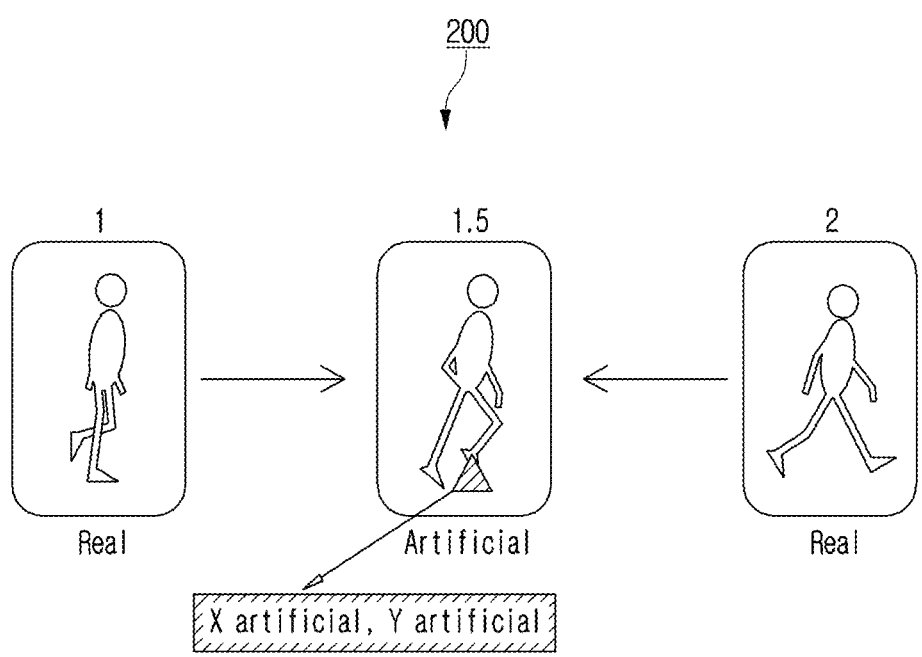
FIG. 2 is a diagram illustrating a scenario in which the user input performed on the artificial frame is supported or considered, according to various embodiments.

FIG. 2 is a diagram (200) illustrating an example scenario in which the user input performed on the artificial frame is supported or considered, according to various embodiments. Unlike the conventional method, the user input is accepted and corrected on the artificial frame according to the disclosure. The accurate recognition of coordinates is essential in the user-interactive application otherwise, it can result in inaccuracies, failed actions, or creates lag in displaying the frames. Transformation of the touch coordinates is performed in order to reflect the real action intended by the user. A transformation matrix on the user touch coordinates is estimated based on the coordinates of the artificial frame. The artificial frame is mapped back to the previous real frame based on pixel-to-pixel correspondences. The pixel-to-pixel correspondences refer to the matching of individual pixels between the artificial frame and the real frame. In this matching process, the transformation matrix is used to enable the accurate alignment and synchronization of visual elements between the artificial frame and the real frame. For example, referring to FIG. 2, when the user gives input (x artificial, y artificial) on frame 1.5, the disclosure causes the interaction with the object of the artificial frame.

Figure 3A:
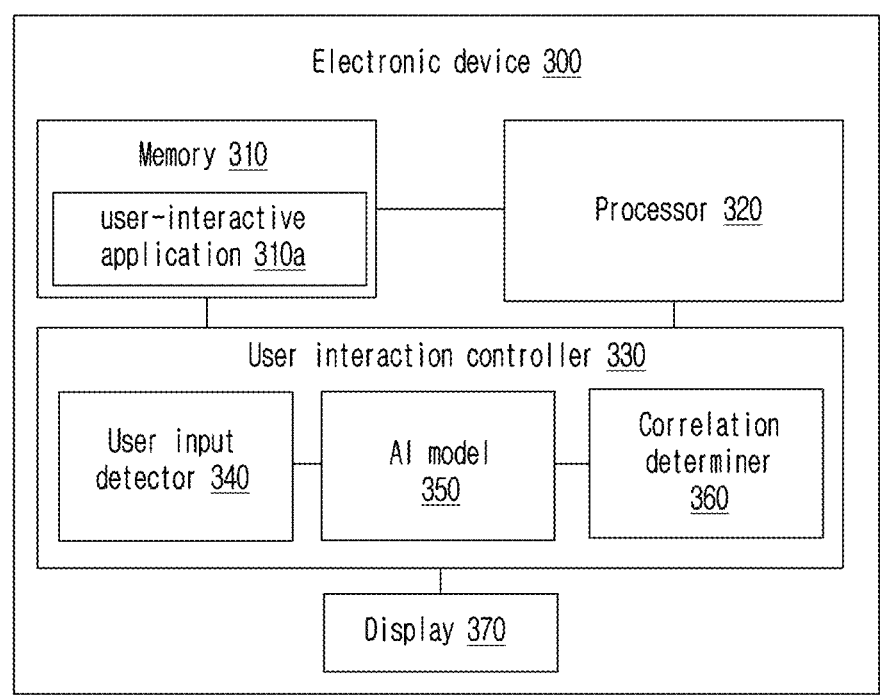
FIGS. 3A and 3B are block diagrams illustrating example configurations of an electronic device for user interaction management to reduce lag in a user-interactive application, according to various embodiments.
Figure 3B:
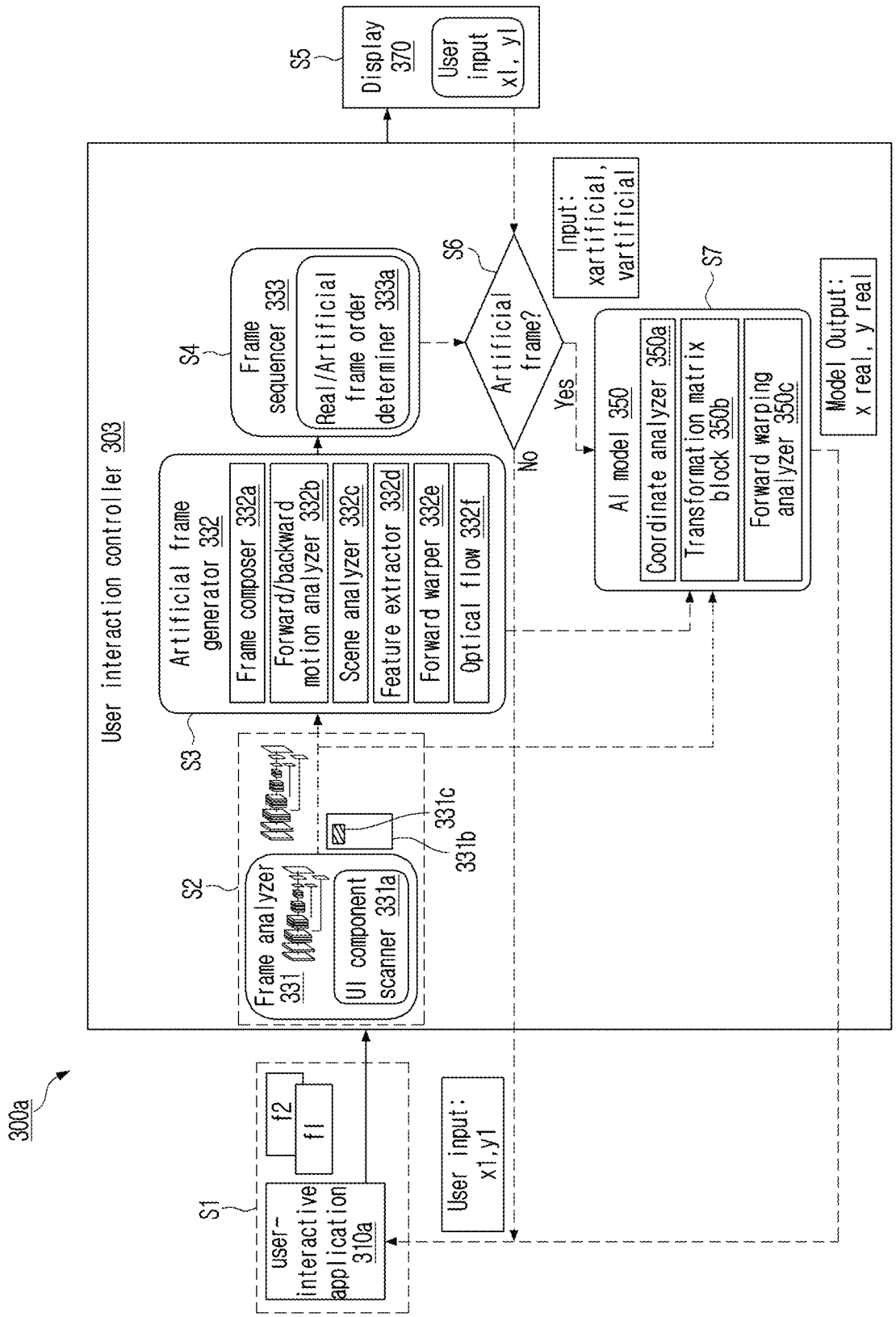

FIGS. 3A and 3B are block diagrams illustrating example configurations of an electronic device (300) for user interaction management in the user-interactive application, according to various embodiments.

The electronic device (300) includes a memory (310), a processor (e.g., including processing circuitry) (320) coupled to the memory (310), and a user interaction controller (e.g., including various circuitry and/or executable program instructions) (330) communicatively coupled to the memory (310) and the processor (320).

The memory (310) is configured to store instructions to be executed by the processor (320). For example, the memory (310) stores the user-interactive application (310a) to be executed by the processor (320). The memory (310) includes non-volatile storage elements. Examples of such non-volatile storage elements include magnetic hard discs, optical discs, floppy discs, flash memories, or forms of Electrically Programmable Memories (EPROM) or Electrically Erasable and Programmable Memories (EEPROM). In addition, the memory (310) in some examples, be considered a non-transitory storage medium. The term "non-transitory" indicates that the storage medium is not embodied in a carrier wave or a propagated signal. The term "non-transitory" is not be interpreted that the memory (310) is non-movable. In various examples, the memory (310) is configured to store larger amounts of information. In certain examples, a non-transitory storage medium stores data that can, over time, change (e.g., in Random Access Memory (RAM) or cache).

The processor (320) includes one or a plurality of processors. The processor (320) according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The one or the plurality of processors is a general-purpose processor, such as a central processing unit (CPU), an application processor (AP), or the like, a graphics processing unit such as a graphics processing unit (GPU), a Visual Processing Unit (VPU), and/or an AI-dedicated processor such as a neural processing unit (NPU). The processor (320) includes multiple cores and is configured to execute the instructions stored in the memory (310).

The user interaction controller (330) may include various circuitry and/or executable program instructions and generates and displays an artificial frame in-between a plurality of real frames of the user-interactive application (310a) and receives a user input on the artificial frame displayed in-between the plurality of real frames of the user-interactive application (310a). The user interaction controller (330) detects the object in the artificial frame on which the user input is received and determines a correlation between the user input, coordinates of object in the real frame of the plurality of real frames, and coordinates of the object in the artificial frame based on the detected object in the artificial frame. Further, the user interaction controller (330) enables interaction with the object in the artificial frame in response to the user input based on the correlation.

The user interaction controller (330) includes a user input detector (340), an AI model (350), and a correlation determiner (360). The user-interactive application (310a) generates the plurality of real frames and determines two or more real frames from the generated plurality of real frames. The electronic device (300) generates and displays the artificial frame in-between the two or more real frames. When a user gives input on the artificial frame displayed in-between the two or more real frames, the user input detector (340) of the user interaction controller (330) detects the object in the artificial frame on which the user input is received from the user. The AI model (350) of the user interaction controller (330) includes correlation information of coordinates of the user input, coordinates of the object in the real frame, and coordinates of the object in the artificial frame. The electronic device (300) inputs the received user input on the artificial frame to the AI model (350) to determine the correlation between the user input, coordinates of object in the real frame, and coordinates of the object in the artificial frame based on the detected object in the artificial frame using the correlation determiner (360).

The user interaction controller (330) is implemented by processing circuitry such as logic gates, integrated circuits, microprocessors, microcontrollers, memory circuits, passive electronic components, active electronic components, optical components, hardwired circuits, or the like, and optionally be driven by firmware. The circuits, for example, be embodied in one or more semiconductor chips, or on substrate supports such as printed circuit boards and the like. The user interaction controller (330) according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The AI model (350) may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks.

The learning process may refer, for example, to a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

The electronic device (300) monitors a plurality of user inputs on a plurality of objects in a plurality of artificial frames and the plurality of real frames of the user-interactive application (310a) and uses the AI model (350) to determine the correlation of coordinates of the user input, the coordinates of the object in the real frame, the coordinates of the object in the artificial frame.

Referring to FIG. 3B, for example, at S1, the user-interactive application (310a) generates the real frames (f1 and f2), where the user-interactive application is not limited to gaming applications. At S2, a frame analyzer (331) of the user interaction controller (330) analyses the real frames generated by the user-interactive application (310a) to determine an area where the UI/static (331b)/dynamic (331c) elements are present and then the area are classified in a form of binary mask using UI component scanner (331a). Also, the frame analyzer (331) sends determined information of the area of the UI/static (331b)/dynamic (331c) elements to the AI model (350) to determine the continuous/discontinuous motion areas in the real frames (f1 and f2).

At S3, an artificial frame generator (332) of the user interaction controller (330) includes a frame composer (332a), a forward/backward motion analyzer (332b), a scene analyzer (332c), a feature extractor (332d), a forward warper (332e), and an optical flow determiner (332f). The frame composer (332a) takes existing frames (f1 and f2) as input, and uses the existing frames (f1 and f2) information to generate new frames and also the frame composer (332a) plays a crucial role in generating artificial frames by combining input information to create visually appealing and contextually relevant image frames with respect to continuous and discontinuous motion areas.

The forward/backward motion analyzer (332b) analyzes the motion information in a sequence of frames (f1 and f2) and determines the direction and magnitude of the motion between consecutive frames (f1 and f2). Also, the forward/backward motion analyzer (332b) typically employs to determine the displacement vectors that describe the movement of objects or pixels between frames (f1 and f2). By analyzing these motion vectors, the forward/backward motion analyzer (332b) identifies the direction (forward or backward) and the speed of the motion. This information is valuable in generating artificial frames to maintain the coherence and realism of the generated content. By understanding the motion in the input frames (f1 and f2), the generator predicts the appropriate motion for the generated frames, ensuring smooth and natural transitions between consecutive frames, where artificial frames are generated to fill in the gaps between existing frames (f1 and f2).

The scene analyzer (332c) captures and interprets scene information needed to generate realistic and contextually appropriate frames. By analyzing the input data (f1 and f2), the scene analyzer (332c) provides valuable insights into the visual, auditory, or other sensory aspects of the scene, which is utilized by the artificial frame generator to create more accurate and immersive artificial frames.

The feature extractor (332d) extracts the visual features to capture and reproduce important characteristics of the input frames (f1 and f2) and enables the generation of the artificial frame. The forward warper (332e) creates the artificial frames by applying specific transformations to the input frames (f1 and f2). These transformations are used to simulate camera movements, change perspectives, or create visual effects and ensures that each pixel in the transformed frame is generated based on a known location in the original frame, making it easier to control and manipulate the resulting images or videos.

The optical flow (332f) generates artificial frame by estimating the motion between two consecutive frames (f1 and f2) and generate plausible intermediate frames that facilitate a seamless transition between the consecutive frames (f1 and f2).

The artificial frame generator (332) generates the artificial frames which are inserted in between the real frames to smoothen the movement of game characters including but not limited to objects, NPC etc., which are part of the game world. Artificial frame generation avoids discontinuous motion area to prevent and/or reduce updates in textual area, such as player positions, game statistics, etc. Thus, creating frames are as real as possible.

After generating the artificial frame, the artificial frame generator (332) sends the generated artificial frame to the frame sequencer (333), where at S4 the frame sequencer (333) arranges real frames and artificial frames in a specific sequence to create a coherent sequence of images or an animation using real/artificial frame order determiner (333a). At S5, the real frames and artificial frame are displayed on the display (370) of the electronic device (300) in the sequenced manner.

When the user gives input on the display (370), for example, the user input is not limited to touch input, gesture, motion input, voice input, virtual reality input, user input from an external controller that is connected to the electronic device (300) and for example when the user input is the touch input on the display, the electronic device (300) detects whether the touch input is received on the artificial frame or real frame based on determining the touch coordinates x1, y1. At S6, the electronic device (300) determines that the touch input coordinates x1, y1 are received on the real frame, the electronic device (300) sends the coordinates of the touch input (x1, y1) as output (x real frame and y real frame) to the user-interactive application (310a) to perform the interaction according to the touch input (x1, y1) received from the user.

When the electronic device (300) at S6 determines that the coordinates of touch input (x1, y1) are received on the artificial frame, the electronic device (300) feeds the artificial frame touch as input (x artificial frame, y artificial frame) to the AI model (350) to detect the object in the artificial frame, where the AI model (350) includes the correlation information of the touch input from the user, coordinates of the object in the real frame, and the coordinates of the object in the artificial frame. When the AI model (350) receives the coordinates of the touch input (x artificial frame, y artificial frame), the AI model (350) determines the correlation between the touch input given by the user, coordinates of the object in the real frame, and coordinates of the object in the artificial frame based on the detected object in the artificial frame.

The AI model (350) includes a coordinate analyzer (350a), a transformation matrix block (350b), and a forward warping analyzer (350c). The coordinate analyzer (350a) determines the coordinates of the touch input on the artificial frame received from the user. The transformation matrix block (350b) is used to map the coordinates of the object in the artificial frame with the coordinates of the object in the real frame. The forward warping analyzer (350c) is used to determine the movement of object from the real frame to the artificial frame, where the information of the object movement from the real frame to the artificial frame is received from the artificial frame generator (332). Once the AI model (350) determines the correlation between the touch input, coordinates of the object in the real frame, and coordinates of the object in the artificial frame, the AI model (350) transfers the determined correlation to the user-interactive application (310a) for causing the interaction of the object in the artificial frame.

In an embodiment, the real frames include at least one discontinuous motion area and/or at least one continuous motion area. Examples of UI elements may include, for example, and without limitation, player statistics, menu buttons, joystick controls on the screen, quest windows or any other elements with discontinuous motion. The generation of the artificial frame is done in such a way that these static areas or areas with discontinuous motion are retained as it is while generating the artificial frame from the plurality of real frames. Additionally, the touch transformation matrix is applied to areas where motion is continuous, whereas not applied to static areas or areas with discontinuous motion.

In an embodiment, the AI model (350) works upon dense optical flow results in displacement which can be linear or non-linear. The displacement represents the spatial shift or movement of pixels between the artificial frame and the real frame and also indicates the pixel in the artificial frame has moved from the original position in the corresponding real frame. Further, the displacement provides essential information to understand the motion and changes that occurred between the real frames and artificial frames. Optical flow is popularly used to estimate the motion of objects in a video sequence by tracking the movement of pixels in a consecutive frame of a video. Basic assumption is that pixels in a video sequence move smoothly from frame to frame. The optical flow model estimates the motion of each pixel in the video sequence by computing the displacement vector between the corresponding pixels in two consecutive frames. These resulting motion vectors are then used to generate a flow field that describes the movement of objects in the scene. Some popular methods are Lucas-Kannade method, Horn-Schunck method and frameback method. The AI model (350) estimates optical flow to determine the motion between the real frames and the artificial frames. Also, the AI model (350) uses the optical flow information to synthesize new artificial or interpolated frames between existing real frames. Further, the AI model (350) establishes pixel-to-pixel correspondences between the artificial frames and real frames to precisely locate each pixel in the artificial frame with respect to the real frame. The AI model (350) takes the input of displacement vectors provided by the artificial frame generator and generates a map for the coordinates from the artificial frame to the real frame. User touch coordinates and displacement vectors are provided as input to the AI model (350) along with a binary mask of UI elements to determine the correlation between the user input, coordinates of object in the real frame, and coordinates of the object in the artificial frame for enabling interaction with the object in the artificial frame based on the determined correlation. No transformation matrix is applied where the discontinuous motion area is present.

In an embodiment, the artificial frame generator (332) is an AI model (350) which generates frames based on inputs from real frames and a frame analyzer. The AI model (350) performs user action analysis and transforms user action into actual real frames. These coordinates are further used for taking action on real frames. The AI model (350) will use the correlation of real and artificial frame to map co-ordinates in artificially generated frames and takes action on future frames by transforming the mapped co-ordinates of the artificially generated frames in real frame.

Lastly, the touch performed by the user on the artificial frames is mapped to real frames using backward motion estimation and the warping method. Transformation of the user touch co-ordinates is performed in the frame generating application to update the frames as per the user input.

Figure 4:
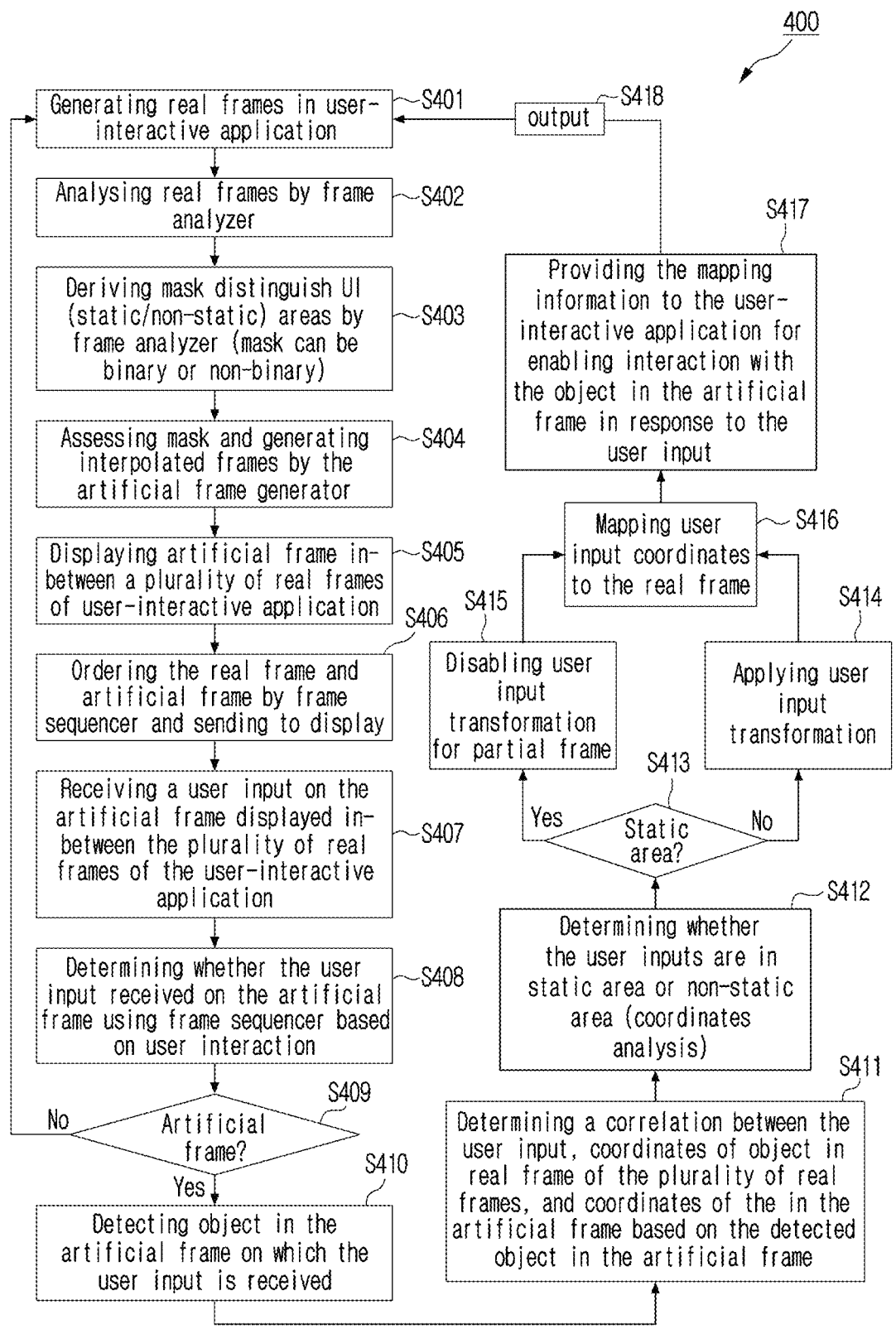
FIG. 4 is a flowchart illustrating an example method for user interaction management to reduce lag in the user-interactive application, according to various embodiments.

FIG. 4 is a flowchart (400) illustrating an example method for user interaction management to reduce lag in the user-interactive application, according to various embodiments.

At S401, the method includes generating real frames in the user-interactive application.

At S402, the method includes analyzing real frames by frame analyzer.

At S403, the method includes deriving mask distinguishing (continuous/discontinuous motion) areas by frame analyzer (mask can be binary or non-binary).

At S404, the method includes assessing the mask and generating interpolated frames by the artificial frame generator.

At S405, the method includes displaying artificial frame in-between the plurality of real frames of the user-interactive application.

At S406, the method includes ordering the real frame and artificial frame by frame sequencer and sending to display.

At S407, the method includes receiving the user input on the artificial frame displayed in-between the plurality of real frames of the user-interactive application. Further, the method includes interacting with the display by the user while accessing the user-interactive application and recording the coordinates in screen space (x1, y1).

At S408, the method includes determining whether the user input received on the artificial frame using frame sequencer based on the user interaction.

At S409, the method includes identifying whether the user input is on the artificial frame.

At S410, the method includes detecting object in the artificial frame on which the user input is received.

At S411, the method includes determining a correlation between the user input, coordinates of object in real frame of the plurality of real frames, and coordinates of the in the artificial frame based on the detected object in the artificial frame.

At S412, the method includes determining whether the user input is in the discontinuous motion area or continuous motion area (coordinates analysis).

At S413, the method includes identifying whether the user input is on the static area.

At S414, the method includes applying user input transformation, when the user input is on the non-static area.

At S415, the method includes disabling user input transformation for the partial frame, when the user input is on static area.

At S416, the method includes mapping user input coordinates to the real frame.

At S417, the method includes providing the mapping information to the user-interactive application (as represented in S418) for enabling interaction with the object in the artificial frame in response to the user input.

The various actions, acts, blocks, steps, or the like in the method is performed in the order presented, in a different order or simultaneously. Further, in various embodiments, some of the actions, acts, blocks, steps, or the like may be omitted, added, modified, skipped, or the like without departing from the scope of the disclosed method.

Figure 5:
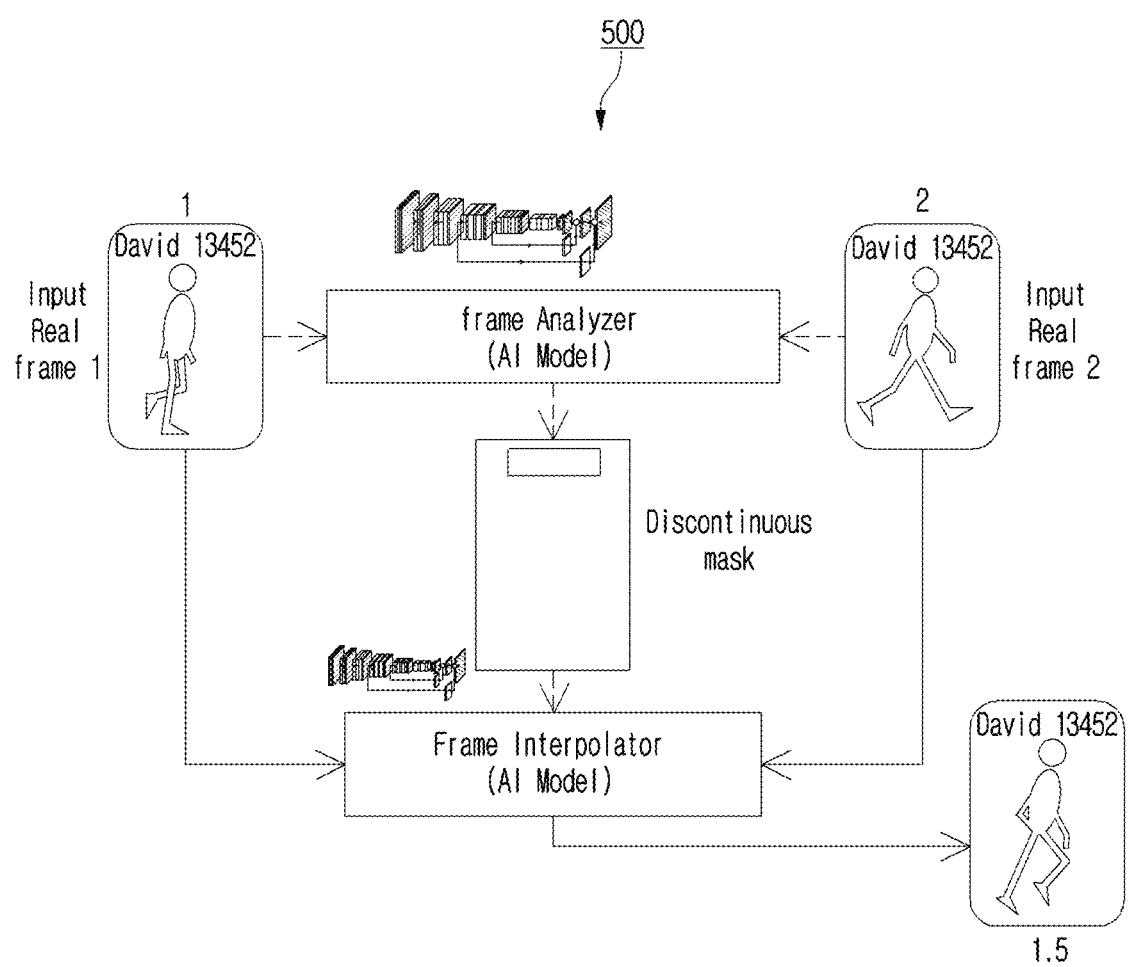
FIG. 5 is a diagram illustrating an example scenario in which properties of the real frames are analyzed and information of the areas of continuous motion area and discontinuous motion area in the real frames are extracted, according to various embodiments.

FIG. 5 is a diagram (500) illustrating an example scenario in which properties of the real frames are analyzed and information of the areas of continuous motion area and discontinuous motion area in the real frames are extracted, according to various embodiments. Furthermore, the technique specifies the differentiation of continuous motion area and discontinuous motion area in the segmentation output, which is employed to generate interpolated frames.

Referring to FIG. 5, the artificial frame (1.5) is generated by frame interpolator, where the frame interpolator gets real frame 1 and real frame 2 as the input.

Figure 6:
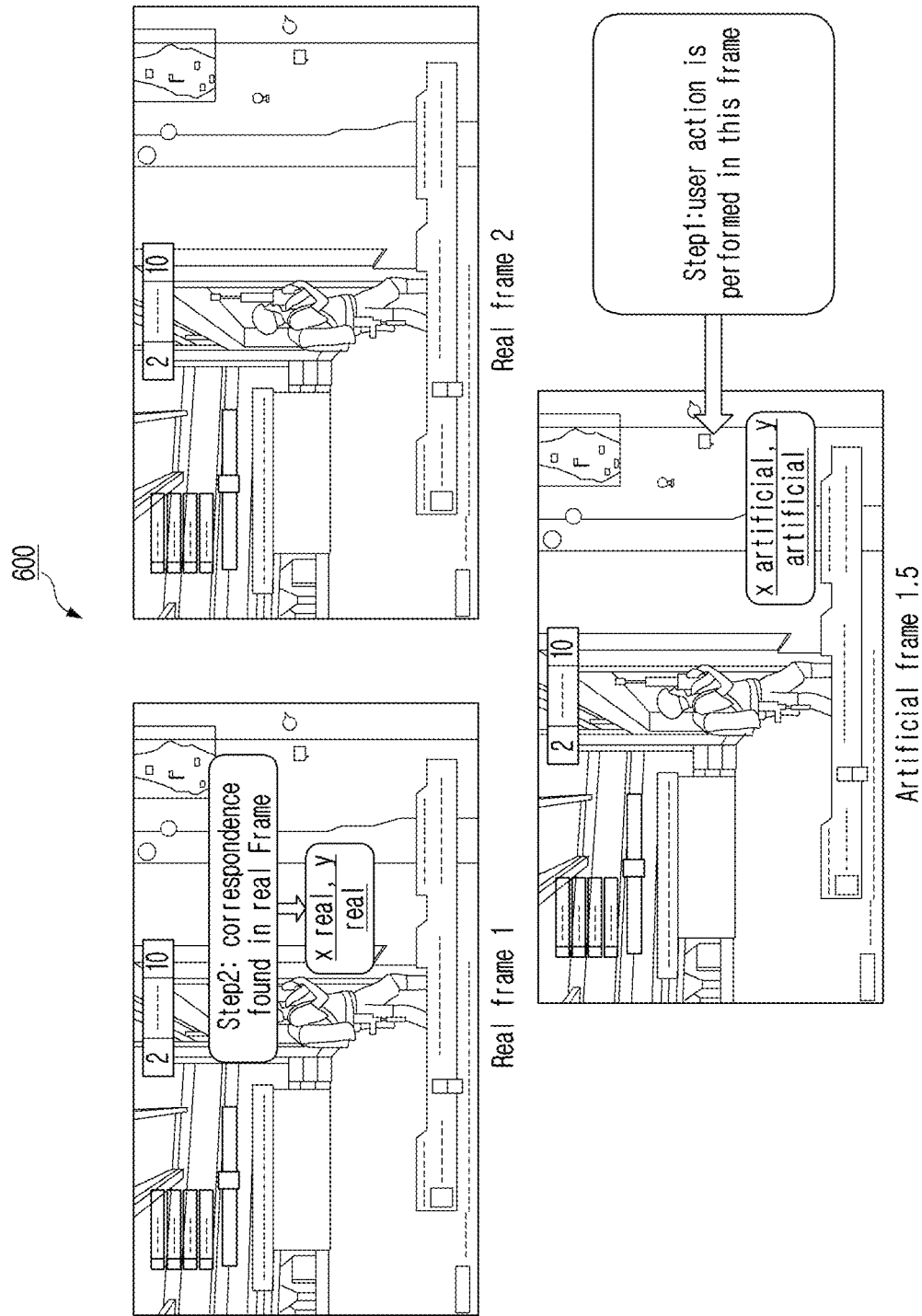
FIG. 6 is a diagram illustrating an example of an artificial frame generated based on the real frames, according to various embodiments.

FIG. 6 is a diagram (600) illustrating an example of the artificial frame generated based on real frames, according to various embodiments.

Referring to FIG. 6, when the user gives input on the artificial frame (1.5), the electronic device (300) determines the correspondence in the real frame (e.g., real frame 1, real frame 2) to perform the interaction on the artificial frame (1.5).

Figure 7:
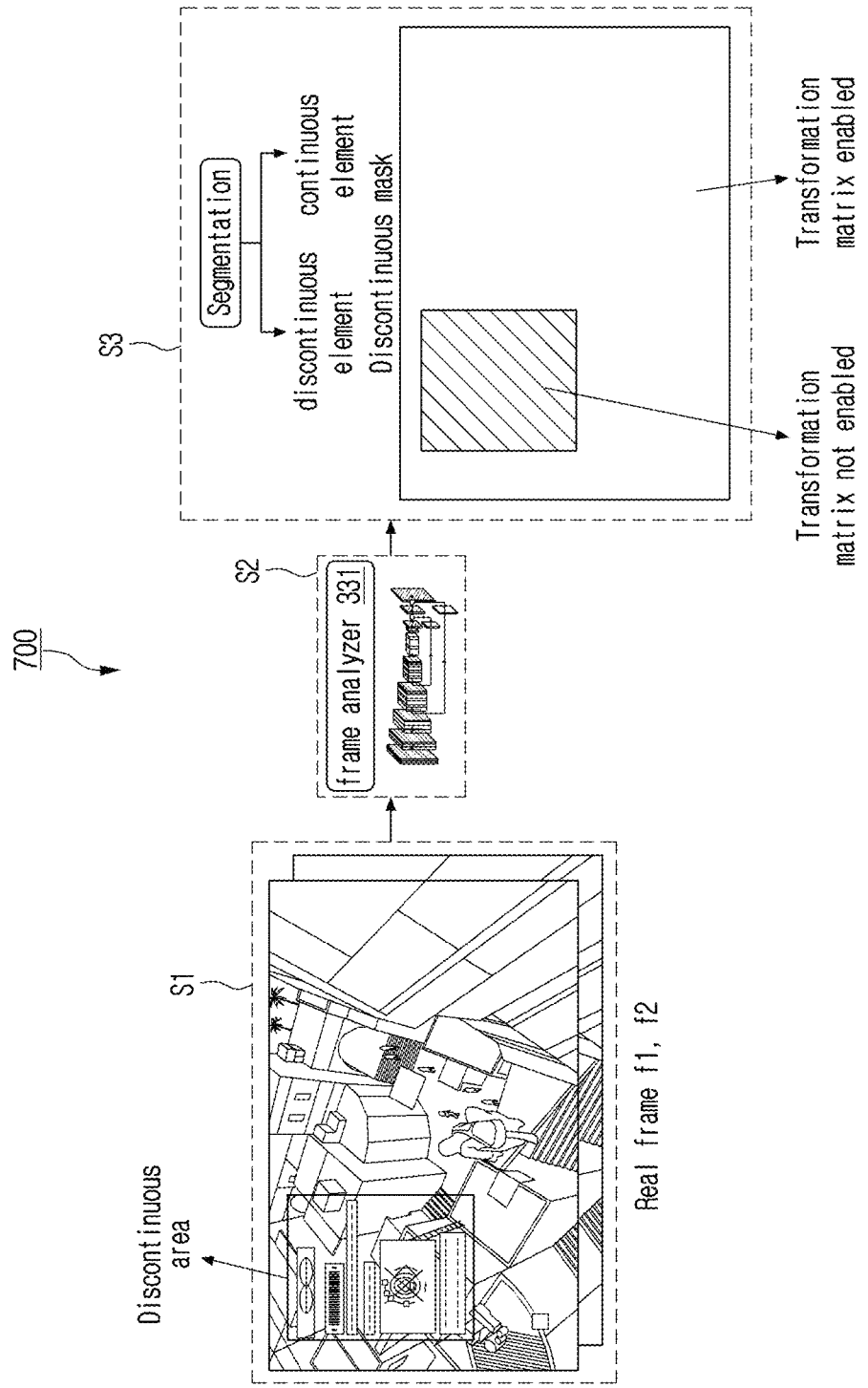
FIG. 7 is a diagram illustrating analysis of real frames and produces binary mask distinguishing continuous motion areas and discontinuous motion areas, according to various embodiments.

FIG. 7 is a diagram (700) illustrating example analysis of real frames and produces binary mask distinguishing continuous motion areas and discontinuous motion areas, according to various embodiments.

Referring to FIG. 7, the S1 represents the real frames f1 and f2, at S2, the AI based frame analyzer (331) analyses and predicts various frame properties in the real frames and identifies the presence or absence of UI element, text areas, player statistics, etc. in a real frames. At S3, the frame analyzer (331) segments the discontinuous element and the continuous element, where the transformation matrix is not enabled in the discontinuous area and the transformation matrix is enabled in the continuous area. When UI element are present in the real frame, the frame analyzer also generates a binary mask, functioning as an informant by activating subsequent frame decisions based on the frame properties.

Figure 8:
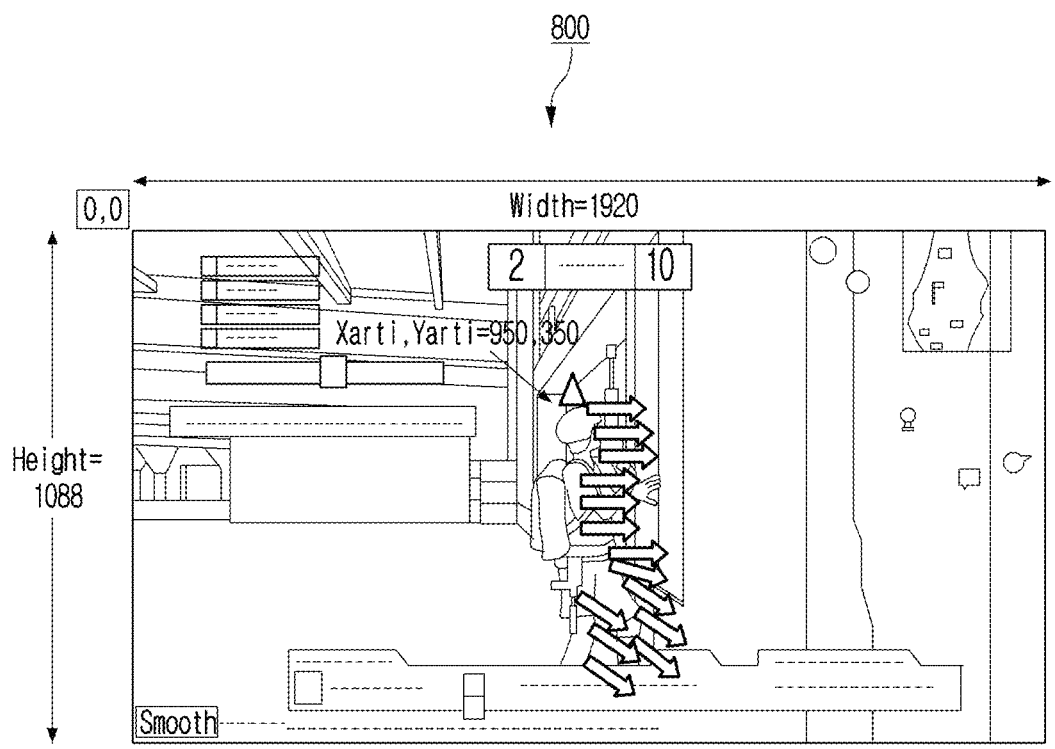
FIG. 8 is a diagram illustrating an example of a motion information between the artificial frame and the real frame, according to various embodiments.

FIG. 8 is a diagram (800) illustrating an example of a motion information between the artificial frame and the real frame, according to various embodiments.

Referring to FIG. 8, when the user give input in the artificial frame, the AI model (350) determines the correlation between the coordinates of the user input, coordinates of the object in the artificial frame (Xart, Yart=950, 350) and mapping the determined user input and the coordinates of the object in the artificial frame (Xart, Yart=950, 350) to the real frame (X real, Y real=940, 350) using displacement vectors (dmvx, dmvy) as illustrated in Table. 1 to enable the interaction on the artificial frame.

TABLE 1

| [Xartificial, Yartificial] | Displacement Vectors [dx1, dy1] | displacement vectors mapped to real frames [dmvx, dmvy] | [Xreal, Yreal] |
| --- | --- | --- | --- |
| 950, 350 | 20, 1 | 10, 0 | 940, 350 |
| 950, 360 | 21, 1 | 10, 0 | 940, 360 |
| 955, 390 | 20, 2 | 10, 1 | 945, 389 |
| 940, 600 | 14, 5 | 7, 2 | 933, 598 |
| 942, 620 | 14, 5 | 7, 2 | 935, 618 |
| 945, 640 | 14, 5 | 7, 2 | 938, 638 |
| 958, 1040 | 15, 20 | 7, 10 | 951, 1030 |
| 960, 1050 | 12, 20 | 6, 10 | 954, 1040 |
| 960, 1052 | 10, 25 | 5, 12 | 955, 1040 |

Figure 9:
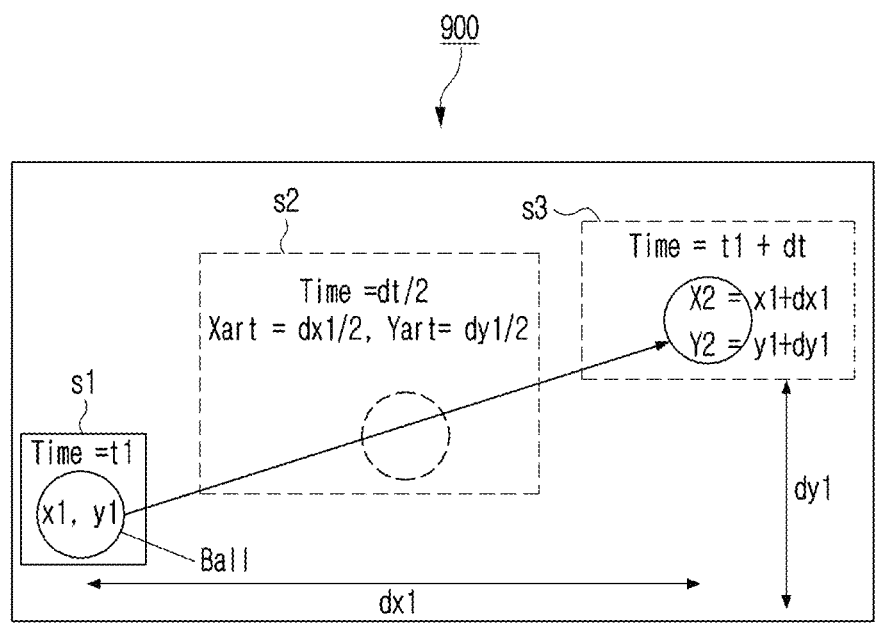
FIG. 9 is a diagram illustrating a linear displacement of arbitrary object between the two real frames, according to various embodiments.

FIG. 9 is a diagram (900) illustrating an example linear displacement of arbitrary object between the two real frames, according to various embodiments.

Referring to FIG. 9, for a linear displacement example, at s1, the ball (object) is in the position of x1, y1 at time t1 in the real frame and in s2, the ball is in the position of the x2=x1+dx1, y2=y1+dy1 in another real frame. The movement of the ball between two real frames are determined as dx1 and dy1. When the user gives input on the artificial frame (X artificial and Y artificial), the AI model (350) determines the displacement vector between the artificial frame and the real frame to determine the correlation between the coordinates of the object in the artificial frame and the coordinates of the object in the real frame to cause the interaction in the artificial frame in response to the user input. Similarly, if the coordinates of the object in another real frame are determined as x2=x1+dx1 and y2=y1+dy1, then the coordinates of the object in artificial frame are determined as xart=dx½ and yart=dy½ as represented in s2.

Figure 10:
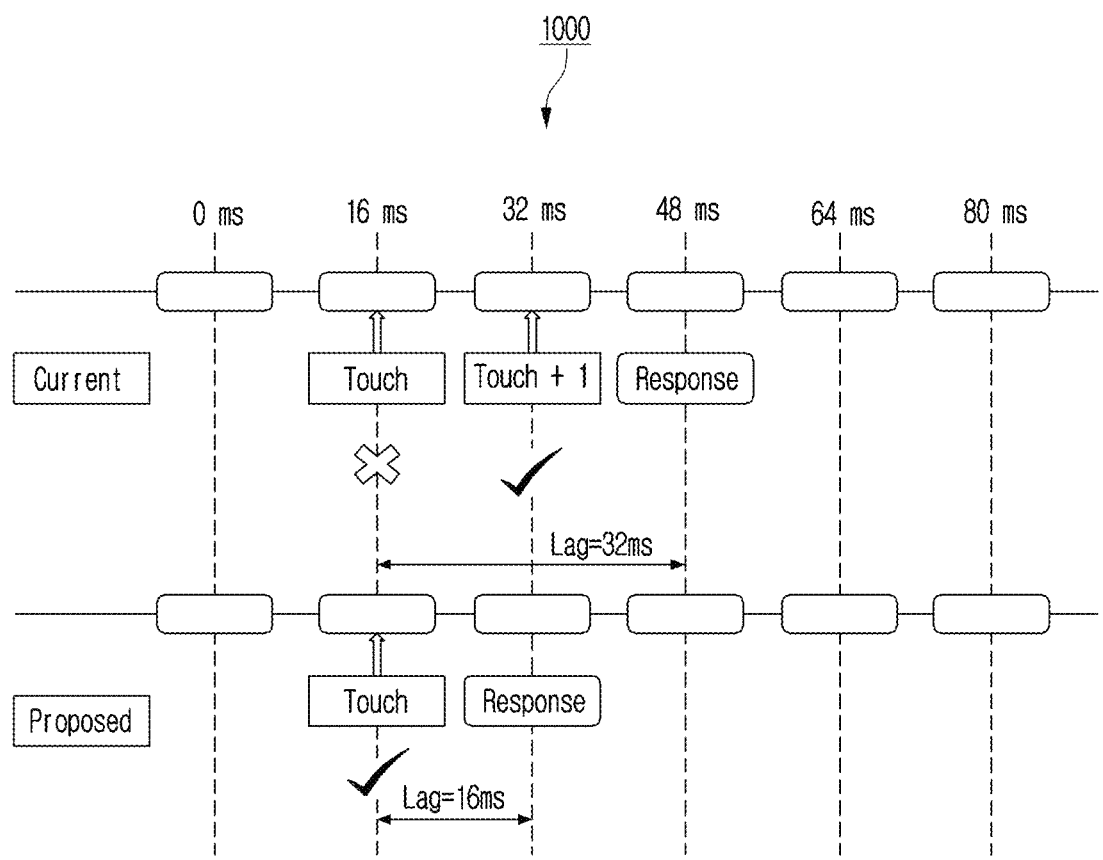
FIG. 10 is a diagram illustrating a comparison of frame interpolation lag reduction, according to various embodiments.

FIG. 10 is a diagram (1000) illustrating example frame interpolation lag reduction, according to various embodiments.

In the current system, when the user gives input on the artificial frame, the existing system either ignores the input on the artificial frame or takes misguided inputs due to motion added in the artificial frame generation. In the either of two scenarios, existing system faces lagging issue (for example more than 32 ms) in the example user-interactive application.

In the disclosed method, when the user gives input on the artificial frame, the disclosed method accepts and corrects the input on the artificial frame which reduces the lag (approx. 16 ms for given example) in the user-interactive application performance.

Whiled the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for user interaction management in a user-interactive application of an electronic device, the method comprising:
displaying, by the electronic device, at least one artificial frame in-between a plurality of real frames of the user-interactive application;
receiving, by the electronic device, an input on the at least one artificial frame displayed in-between the plurality of real frames of the user-interactive application;
detecting, by the electronic device, at least one object in the at least one artificial frame on which the input is received;
determining, by the electronic device, a correlation between the input, coordinates of at least one object in at least one real frame of the plurality of real frames, and coordinates of the at least one object in the at least one artificial frame based on the detected at least one object in the at least one artificial frame; and
enabling, by the electronic device, interaction with the at least one object in the at least one artificial frame based on the determined correlation.

2. The method as claimed in claim 1, wherein the interaction with the at least one object in the at least one artificial frame includes applying a transformation matrix based on the determined correlation.

3. The method as claimed in claim 2, wherein performing, by the electronic device, the interaction of the input by applying an input transformation matrix in response to received input comprises:
determining, by the electronic device, whether the input is received on at least one discontinuous motion area of the at least one artificial frame or at least one continuous motion area of the at least one artificial frame;
performing, by the electronic device, one of:
applying, by the electronic device, the input transformation matrix to the at least one continuous motion area based on the input being received on the at least one continuous motion area; or
ignoring, by the electronic device, the received input.

4. The method as claimed in claim 1, wherein the method comprises generating or training, by the electronic device, an AI model, wherein generating or training comprises:
monitoring, by the electronic device, a plurality of inputs on a plurality of objects in a plurality of artificial frames and the plurality of real frames of the user-interactive application; and
determining, by the electronic device, the correlation of coordinates of the at least one input, the coordinates of the at least one object in the at least one real frame, the coordinates of the at least one object in the at least one artificial frame using the pretrained AI model.

5. The method as claimed in claim 1, wherein the at least one artificial frame is generated using at least any one of an interpolation method and an extrapolation method.

6. The method as claimed in claim 1, wherein the real frames include at least one discontinuous motion area and/or at least one continuous motion area.

7. The method as claimed in claim 1, wherein the method comprises:
  inputting, by the electronic device, received input to an AI model based on the input being received on the at least one artificial frame; or
  sending, by the electronic device, the received input to the user-interactive application based on the input being received on the at least one real frame.

8. An electronic device configured for user interaction management in a user-interactive application, wherein the electronic device comprises:
  a memory;
  at least one processor, comprising processing circuitry, coupled to the memory;
  a user interaction controller, comprising processing circuitry, communicatively coupled to the memory and the at least one processor, wherein the user interaction controller is configured to control the electronic device to:
    display at least one artificial frame in-between a plurality of real frames of the user-interactive application;
    receive an input on the at least one artificial frame displayed in-between the plurality of real frames of the user-interactive application;
    detect at least one object in the at least one artificial frame on which the input is received;
    determine a correlation between the input, coordinates of at least one object in at least one real frame of the plurality of real frames, and coordinates of the at least one object in the at least one artificial frame based on the detected at least one object in the at least one artificial frame; and
    enable interaction with the at least one object in the at least one artificial frame based on the determined correlation.

9. The electronic device as claimed in claim 8, wherein the interaction with the at least one object in the at least one artificial frame is enabled by applying a transformation matrix based on the determined correlation.

10. The electronic device as claimed in claim 9, wherein the electronic device is configured to:
  determine whether the input is received on at least one discontinuous motion area of the at least one artificial frame or at least one continuous motion area of the at least one artificial frame;
  and perform one of:
    apply the user transformation matrix to the at least one continuous motion area based on the input being received on the at least one continuous motion area; or
    ignore the received input.

11. The electronic device as claimed in claim 8, wherein the electronic device is configured to:
  monitor a plurality of inputs on a plurality of objects in a plurality of artificial frames and the plurality of real frames of the user-interactive application; and
  determine the correlation of coordinates of the at least one input, the coordinates of the at least one object in the at least one real frame, the coordinates of the at least one object in the at least one artificial frame using a trained AI model.

12. The electronic device as claimed in claim 8, wherein the at least one artificial frame is configured to be generated using at least any one of interpolation and extrapolation methods.

13. The electronic device as claimed in claim 8, wherein the real frames include at least one discontinuous motion area and/or at least one continuous motion area.

14. The electronic device as claimed in claim 8, wherein the electronic device is configured to:
  input the received input to an AI model based on the input being received on the at least one artificial frame; or
  send the received input to the user-interactive application based on the input being received on the at least one real frame.

15. A non-transitory computer readable recording medium including a program which, when executed by processor circuitry, performs a controlling method of an electronic device, the method comprising:
  displaying, by the electronic device, at least one artificial frame in-between a plurality of real frames of a user-interactive application;
  receiving, by the electronic device an input on the at least one artificial frame displayed in-between the plurality of real frames of the user-interactive application;
  detecting, by the electronic device, at least one object in the at least one artificial frame on which the input is received;
  determining, by the electronic device, a correlation between the input, coordinates of at least one object in at least one real frame of the plurality of real frames, and the coordinates of at least one object in the at least one artificial frame based on the detected at least one object in the at least one artificial frame; and
  enabling, by the electronic device, interaction with the at least one object in the at least one artificial frame based on the determined correlation.

* * * * *